United States Patent
Wang et al.

(10) Patent No.: US 7,551,390 B1
(45) Date of Patent: *Jun. 23, 2009

(54) DISK DRIVE TO CHARACTERIZE MISALIGNED SERVO WEDGES

(75) Inventors: Zhi Wang, Irvine, CA (US); Jenghung Chen, Cupertino, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/842,315

(22) Filed: Aug. 21, 2007

(51) Int. Cl.
*G11B 5/596* (2006.01)
*G11B 5/09* (2006.01)

(52) U.S. Cl. ........... 360/77.04; 360/51
(58) Field of Classification Search .......... None
See application file for complete search history.

(56) References Cited

U.S. PATENT DOCUMENTS

| | | | |
|---|---|---|---|
| 5,130,866 A | 7/1992 | Klaassen et al. | |
| 5,297,131 A | 3/1994 | Tanaka | |
| 5,589,996 A | 12/1996 | Patrick et al. | |
| 5,594,595 A | 1/1997 | Zhu | |
| 5,691,857 A | 11/1997 | Fitzpatrick et al. | |
| 5,742,446 A | 4/1998 | Tian et al. | |
| 5,751,512 A | 5/1998 | Anderson | |
| 5,761,165 A | 6/1998 | Takeda et al. | |
| 5,926,338 A * | 7/1999 | Jeon et al. | 360/77.04 |
| 5,978,168 A | 11/1999 | Mathews et al. | |
| 5,991,115 A | 11/1999 | Chainer et al. | |
| 5,998,994 A | 12/1999 | Mori | |
| 6,008,640 A | 12/1999 | Tan et al. | |
| 6,008,962 A | 12/1999 | Le et al. | |
| 6,014,283 A | 1/2000 | Codilian et al. | |
| 6,052,243 A | 4/2000 | Shimada | |
| 6,061,201 A | 5/2000 | Woods | |
| 6,067,205 A | 5/2000 | Mathews et al. | |
| 6,097,559 A | 8/2000 | Ottesen et al. | |
| 6,288,856 B1 | 9/2001 | Ottesen et al. | |
| 6,310,742 B1 * | 10/2001 | Nazarian et al. | 360/77.04 |
| 6,317,285 B1 | 11/2001 | Bi et al. | |
| 6,493,169 B1 | 12/2002 | Ferris et al. | |
| 6,510,017 B1 | 1/2003 | Abdelnour | |
| 6,568,252 B1 | 5/2003 | Boutaghou | |
| 6,657,810 B1 | 12/2003 | Kupferman | |
| 6,687,078 B1 | 2/2004 | Kim | |
| 6,700,724 B2 | 3/2004 | Riddering et al. | |
| 6,717,764 B2 | 4/2004 | Lake | |
| 6,754,025 B1 | 6/2004 | Shepherd et al. | |
| 6,754,030 B2 | 6/2004 | Seng et al. | |

(Continued)

*Primary Examiner*—K. Wong
(74) *Attorney, Agent, or Firm*—Blakely, Sokoloff, Taylor & Zafman

(57) ABSTRACT

Disclosed is a disk drive and method to characterize misaligned servo wedges. The disk drive includes an actuator arm, a head, a disk, and a servo controller. The head is connected to a distal end of the actuator arm in which the actuator arm is rotatable about a pivot to move the head radially over the disk. The servo controller is used to characterize misaligned servo wedges by implementing operations including: commanding the head to track follow on a track; measuring wedge-to-wedge time (WTWT) values corresponding to time intervals between identified servo wedges; calculating wedge-to-wedge time (WTWT) variations for the measured WTWT values; and characterizing the calculated WTWT variations, wherein, characterizing the calculated WTWT variations for the track includes utilizing a WTWT variation modeling function to model the WTWT variations.

26 Claims, 7 Drawing Sheets

U.S. PATENT DOCUMENTS

| | | | |
|---|---|---|---|
| 6,762,899 B2 | 7/2004 | Ottesen et al. | |
| 6,785,081 B2 | 8/2004 | Chapin et al. | |
| 6,798,605 B2 | 9/2004 | Kurita et al. | |
| 6,801,376 B2 | 10/2004 | Smith | |
| 6,822,816 B2 | 11/2004 | Dakroub | |
| 6,847,503 B2 * | 1/2005 | Zhang et al. | 360/77.04 |
| 6,865,040 B2 | 3/2005 | Fayeulle et al. | |
| 6,914,740 B1 | 7/2005 | Tu et al. | |
| 6,947,248 B2 | 9/2005 | Allen et al. | |
| 6,972,540 B1 * | 12/2005 | Wang et al. | 318/400.34 |
| 6,980,383 B2 | 12/2005 | Brunnett | |
| 6,999,266 B1 * | 2/2006 | Schmidt | 360/77.04 |
| 7,016,131 B2 | 3/2006 | Liu et al. | |
| 7,038,875 B2 | 5/2006 | Lou et al. | |
| 7,046,463 B2 | 5/2006 | Gay Sam et al. | |
| 7,064,659 B2 | 6/2006 | Baumgartner et al. | |
| 7,068,451 B1 | 6/2006 | Wang et al. | |
| 7,068,457 B2 | 6/2006 | Riddering et al. | |
| 7,095,578 B2 | 8/2006 | Ma | |
| 7,099,108 B2 * | 8/2006 | Zayas | 360/75 |
| 7,121,133 B2 | 10/2006 | Chu et al. | |
| 7,124,625 B1 | 10/2006 | Kurita et al. | |
| 7,126,776 B1 | 10/2006 | Warren, Jr. et al. | |
| 7,136,248 B2 | 11/2006 | Tanner | |
| 7,139,149 B1 * | 11/2006 | Sun et al. | 360/77.04 |
| 7,158,325 B1 | 1/2007 | Hu et al. | |
| 7,180,692 B1 | 2/2007 | Che et al. | |
| 7,212,374 B1 | 5/2007 | Wang et al. | |
| 7,251,098 B1 * | 7/2007 | Wang et al. | 360/77.04 |
| 7,349,170 B1 | 3/2008 | Rudman et al. | |
| 7,362,534 B1 | 4/2008 | Schreck et al. | |
| 2002/0054446 A1 | 5/2002 | Smith | |
| 2002/0063545 A1 | 5/2002 | Bloyer et al. | |
| 2002/0122267 A1 | 9/2002 | Morioka | |
| 2002/0167745 A1 | 11/2002 | Ottesen et al. | |
| 2003/0002183 A1 | 1/2003 | Fioravanti | |
| 2003/0184899 A1 | 10/2003 | Gay Sam et al. | |
| 2003/0218813 A1 | 11/2003 | Dakroub | |
| 2007/0047133 A1 | 3/2007 | Allen | |
| 2007/0127148 A1 | 6/2007 | Yokohata et al. | |
| 2007/0146920 A1 | 6/2007 | Kitamura et al. | |
| 2007/0188908 A1 | 8/2007 | Kurita et al. | |
| 2007/0291401 A1 | 12/2007 | Sun et al. | |

\* cited by examiner

DISK DRIVE TO CHARACTERIZE MISALIGNED SERVO WEDGES

BACKGROUND

1. Field

The present invention relates to disk drives. More particularly, the present invention relates to a disk drive that characterizes misaligned servo wedges.

2. Description of the Prior Art and Related Information

A huge market exists for disk drives for mass-market computing devices such as desktop computers and laptop computers, as well as small form factor (SFF) disk drives for use in mobile computing devices (e.g. personal digital assistants (PDAs), cell-phones, digital cameras, etc.). To be competitive, a disk drive should be relatively inexpensive and provide substantial capacity, rapid access to data, and reliable performance.

Disk drives typically employ a moveable head actuator to frequently access large amounts of data stored on a disk. One example of a disk drive is a hard disk drive. A conventional hard disk drive has a head disk assembly ("HDA") including at least one magnetic disk ("disk"), a spindle motor for rapidly rotating the disk, and a head stack assembly ("HSA") that includes a head gimbal assembly (HGA) with a moveable transducer head for reading and writing data. The HSA forms part of a servo control system that positions the moveable transducer head over a particular track on the disk to read or write information from and to that track, respectively.

Typically, a conventional hard disk drive includes a disk having a plurality of concentric tracks. Each surface of each disk conventionally contains a plurality of concentric data tracks angularly divided into a plurality of data sectors. In addition, special servo information may be provided on each disk to determine the position of the moveable transducer head.

The most popular form of servo is called "embedded servo" wherein the servo information is written in a plurality of servo sectors or wedges that are angularly spaced from one another and are interspersed between data sectors around each track of each disk. Each servo wedge typically includes at least a phase lock loop (PLL) field, a servo synch mark (SSM) field, a track identification (TKID), a wedge ID field having a binary encoded wedge ID number to identify the wedge, and a group of servo bursts (e.g. an alternating pattern of magnetic transitions) which the servo control system of the disk drive samples to align the moveable transducer head with or relative to a particular track. Typically, the servo control system moves the transducer head toward a desired track during a course "seek" mode using the TKID field as a control input. Once the moveable transducer head is generally over the desired track, the servo control system uses the servo bursts to keep the moveable transducer head over that track in a fine "track follow" mode. During track following mode, the moveable transducer head repeatedly reads the wedge ID field of each successive servo wedge to obtain the binary encoded wedge ID number that identifies each wedge of the track. In this way, the servo control system continuously knows where the moveable transducer head is relative to the disk.

Today, disks, especially for small form factor (SFF) disk drives, are increasingly being servo-written by external media servo writers before being assembled into disk drives. During external media servo-writing, multiple disks are simultaneously servo-written to without having to be located in a disk drive. The external media servo writer typically controls a rotatable actuator assembly including actuator arms having one or more heads respectively attached to each actuator arm, in which the actuator assembly rotates about a pivot such that the heads are radially positioned over the disks, respectively, in order to write servo sectors onto the disk based upon a timing clock.

When the externally servo-written disks are later assembled into a disk drive, servo wedge misalignment often occurs due to the different mechanical characteristics of the actuator assembly of the external servo writer and that of the disk drive. In particular, disk slip often occurs which is caused by gap differences in the mechanical hub of the disk drive versus that of the external servo writer. Further, disk slip may occur due to shock forces that have been applied to the disk drive.

In particular, the servo wedges of the disk may be misaligned relative to the rotating center of the disk because of disk slip. Thus, disk slip creates a radial displacement error for the head during track following and read/write operations. This radial displacement error of the head further varies dependent upon the track zone of the disk. For example, outer diameter (OD) and inner diameter (ID) track zones may have different radial displacement errors in response to skew angles. In the presence of large disk slip, the head may sway back and forth during track following mode, often over many tracks. These effects are intensified due to the micro-jogging displacement of the read and write elements of the head. Because of this, a great deal of position and timing uncertainties are introduced into the servo control system thereby causing problems during track following and read/write operations.

More particularly, due to this servo wedge misalignment, the servo control system may be very inefficient in track-following resulting in long time delays, and in the worst case, may not be able to consistently lock onto servo sectors during track following resulting in the failure of the disk drive. Further, in the presence of large disk slip, over track writing may occur resulting in disk drive errors.

SUMMARY

In one embodiment of the invention, a disk drive to characterize servo wedges that are misaligned is disclosed. The disk drive includes an actuator arm, a head, a disk, and a servo controller. The head is connected to a distal end of the actuator arm in which the actuator arm is rotatable about a pivot to move the head radially over the disk. The disk includes a plurality of tracks, in which, a substantial majority of the tracks include a plurality of servo wedges spaced sequentially around the circumference of the track for use in track following. The servo controller is used to characterize misaligned servo wedges by implementing operations including: commanding the head to track follow on a track; measuring wedge-to-wedge time (WTWT) values corresponding to time intervals between identified servo wedges; calculating wedge-to-wedge time (WTWT) variations for the measured WTWT values; and characterizing the calculated WTWT variations, wherein, characterizing the calculated WTWT variations for the track includes utilizing a WTWT variation modeling function to model the WTWT variations.

In another embodiment of the invention, a method to characterize misaligned servo wedges in a disk drive is disclosed. The disk drive includes an actuator arm and a head connected to a distal end of the actuator arm, in which, the actuator arm is rotatable about a pivot to move the head radially over the disk. The disk includes a plurality of tracks, in which, a substantial majority of the tracks include a plurality of servo wedges spaced sequentially around the circumference of the track for use in track following. The method to characterize the misaligned servo wedges includes: commanding the head to track follow on a track; measuring wedge-to-wedge time (WTWT) values corresponding to time intervals between identified servo wedges; calculating wedge-to-wedge time (WTWT) variations for the measured WTWT values; and characterizing the calculated WTWT variations, wherein, characterizing the calculated WTWT variations for the track includes utilizing a WTWT variation modeling function to model the WTWT variations.

In yet another embodiment of the invention, a disk drive to characterize misaligned servo wedges is disclosed. The disk drive includes a means for moving a head radially over a disk having a plurality of tracks, in which, a substantial majority of the tracks include a plurality of servo wedges spaced sequentially around a circumference of the track for use in track following, and means for commanding the head to track follow on the track. The disk drive further includes: means for measuring wedge-to-wedge time (WTWT) values corresponding to time intervals between identified servo wedges; means for calculating wedge-to-wedge time (WTWT) variations for the measured WTWT values; and means for characterizing the calculated WTWT variations, wherein, the means for characterizing the calculated WTWT variations in a track includes utilizing a WTWT variation modeling function to model the WTWT variations.

The foregoing and other features of the invention are described in detail below and are set forth in the appended claims.

DETAILED DESCRIPTION

Figure 1:
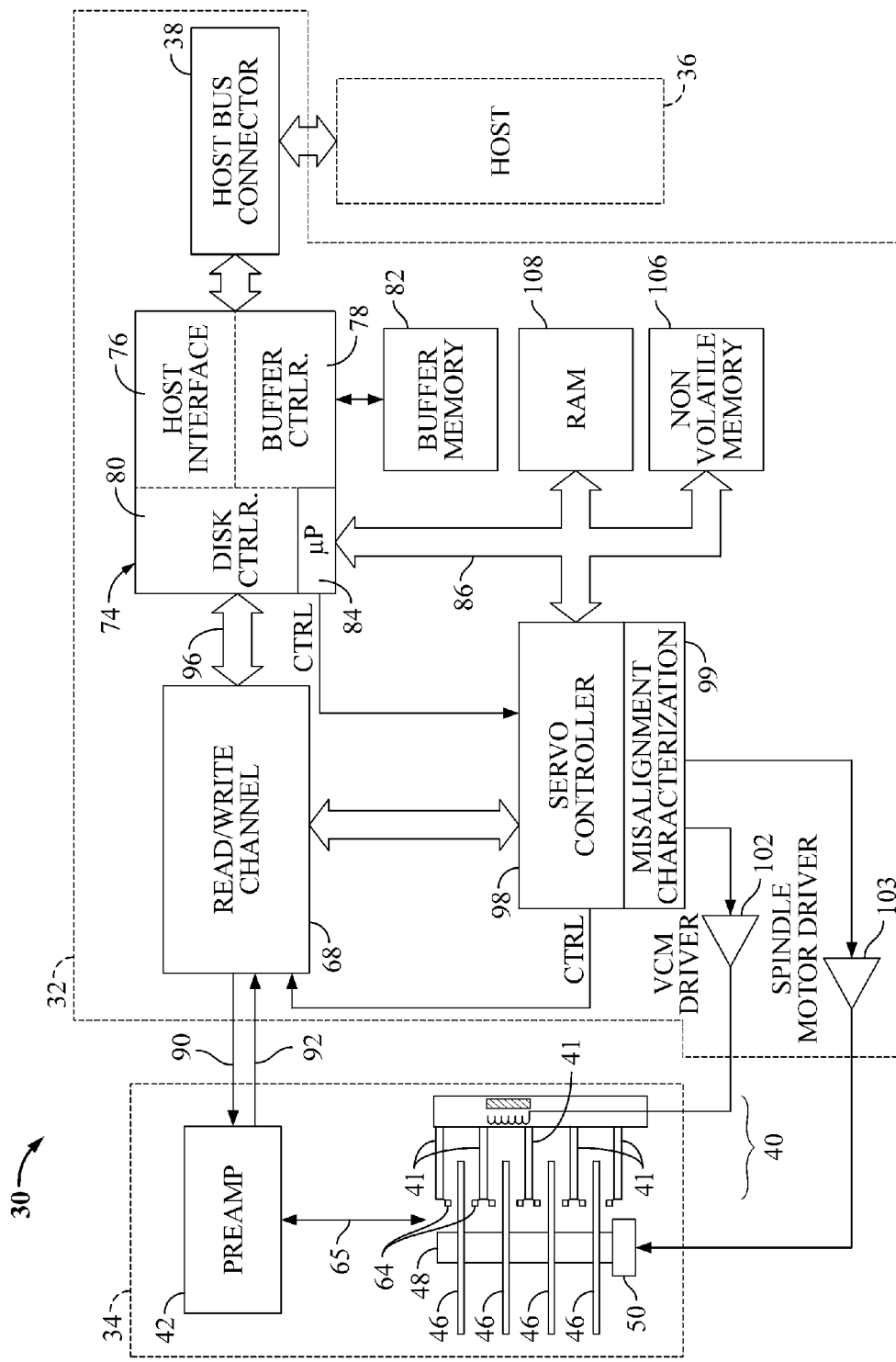
FIG. 1 shows a simplified block diagram of a disk drive, in which embodiments of the invention may be practiced.

FIG. 1 shows a simplified block diagram of disk drive 30, in which embodiments of the invention may be practiced. Disk drive 30 may comprise a head/disk assembly (HDA) 34 and a controller printed circuit board assembly (PCBA) 32. Host 36 may be a computing device 36 such as a desktop computer, a laptop computer, a mobile computing device (e.g. PDA, camera, cell-phone, etc.), or any type of computing device. Disk drive 30 may be of a suitable form factor and capacity for larger computers or for smaller mobile devices (e.g. a small form factor (SFF) disk drive).

HDA 34 may include: one or more disks 46 for data storage; a spindle motor 50 for rapidly spinning each disk 46 (four shown) on a spindle 48; and an actuator assembly 40 for moving a plurality of heads 64 in unison over each disk 46. Actuator assembly 40 includes a plurality of actuator arms 41 having heads 64 attached to distal ends thereof, respectively, such that the actuator arms 41 and heads 64 are rotated about a pivot point so that the heads sweep radially across the disks 46, respectively. The heads 64 are connected to a preamplifier 42 via a cable assembly 65 for reading and writing data on disks 46. Preamplifier 42 is connected to channel circuitry in controller PCBA 32 via read data line 92 and write data line 90.

Controller PCBA 32 comprises a read/write channel 68, servo controller 98, host interface and disk controller (HIDC) 74, voice coil motor driver (VCM) 102, spindle motor driver (SMD) 103, microprocessor 84, and several memory arrays—buffer or cache memory 82, RAM 108, and non-volatile memory 106.

Host initiated operations for reading and writing data in disk drive 30 may be executed under control of microprocessor 84 connected to the controllers and memory arrays via a bus 86. Program code executed by microprocessor 84 may be stored in non-volatile memory 106 and random access memory RAM 108. Program overlay code stored on reserved tracks of disks 46 may also be loaded into RAM 108 as required for execution.

During disk read and write operations, data transferred by preamplifier 42 may be encoded and decoded by read/write channel 68. During read operations, channel 68 may decode data into digital bits transferred on an NRZ bus 96 to HIDC 74. During write operations, HIDC may provide digital data over the NRZ bus to channel 68 which encodes the data prior to its transmittal to preamplifier 42. Channel 68 may employ PRML (partial response maximum likelihood) coding techniques, although other coding processes may be used with equal advantage.

HIDC 74 may comprise a disk controller 80 for formatting and providing error detection and correction of disk data, a host interface controller 76 for responding to commands from host 36, and a buffer controller 78 for storing data which is transferred between disks 46 and host 36. Collectively the controllers in HIDC 74 provide automated functions which assist microprocessor 84 in controlling disk operations.

Servo controller 98 provides an interface between microprocessor 84 and actuator assembly 40 and spindle motor 50. Microprocessor 84 commands logic in servo controller 98 to position actuator assembly 40 using a VCM driver 102 and to precisely control the rotation of spindle motor 50 with a spindle motor driver 103.

In one embodiment, disk drive 30 may employ a sampled servo system in which equally spaced servo wedge sectors (termed "servo wedges") are recorded on each track of each disk 46. Data sectors are recorded in the intervals between servo sectors on each track. Servo sectors are sampled at regular intervals by servo controller 98 to provide servo position information to microprocessor 84. Servo sectors are received by channel 68, and are processed by servo controller 98 to provide position information to microprocessor 84 via bus 86.

Servo controller 98 may operate under the control of a program or routine, such as a servo wedge misalignment program 99, to execute methods or processes in accordance with embodiments of the invention related to characterizing servo wedges that are misaligned with respect to the rotating center of disk 46, due to disk slip, and to compensate for this misalignment, as will be described.

Figure 2:
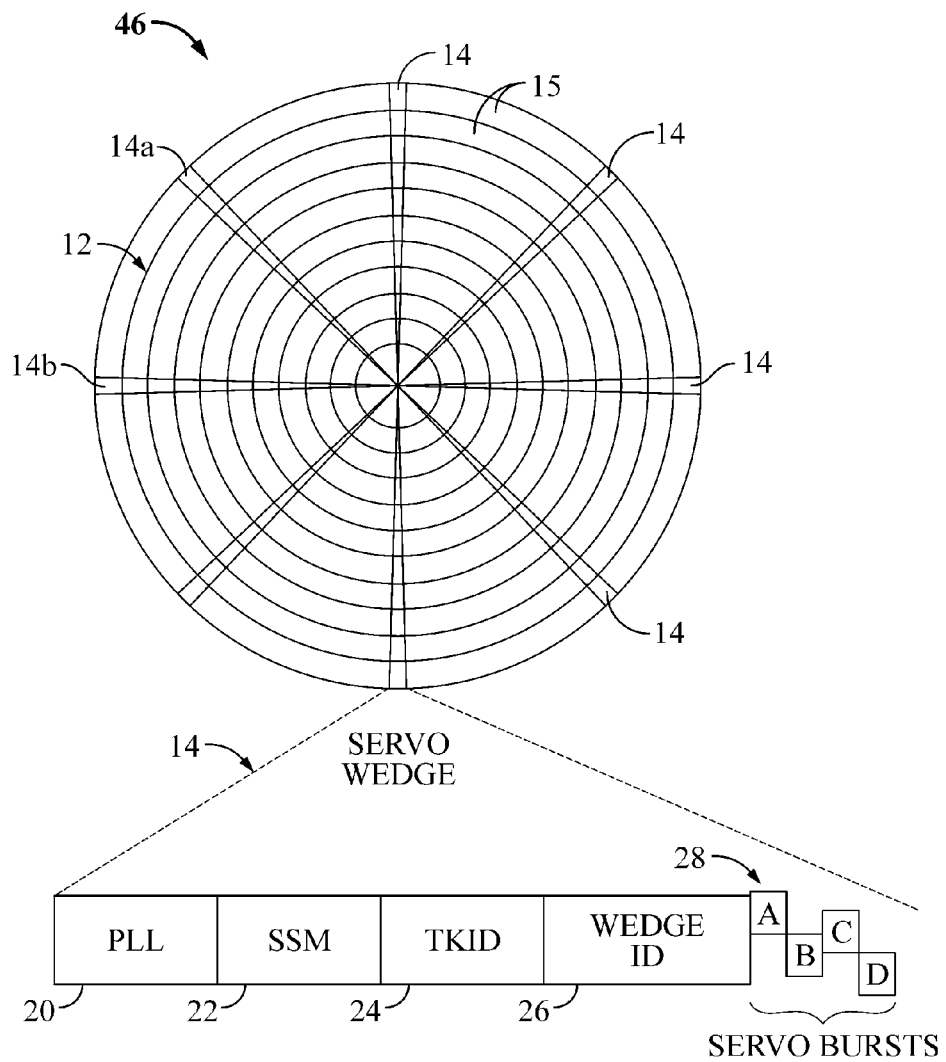
FIG. 2 shows a disk of the disk drive of FIG. 1 having a plurality of concentric tracks, and more particularly, illustrates components of a servo wedge.

FIG. 2 shows an exemplary disk 46 of the disk drive 30 of FIG. 1 having a plurality of concentric tracks, and more particularly, illustrates exemplary components of a servo sector or wedge 14. Disk 46 includes a plurality of concentric circumferential tracks 12. Each circumferential track 12 may include a plurality of embedded servo wedges 14 utilized in seeking and track following. The plurality of servo wedges 14 may be spaced sequentially around a circumference of the circumferential track 12. For example, embedded servo wedges 14a, 14b, etc., contain servo information utilized in seeking and track following and are interspersed between data regions 15 of the disk 46. Data is conventionally written in the data regions 15 in a plurality of discrete data sectors. Each data region 15 is typically preceded by a servo wedge 14.

Each servo wedge 14 may include a phase lock loop (PLL) field 20, a servo synch mark (SSM) field 22, a track identification (TKID) field 24, a wedge identifier (ID) 26, and a group of servo bursts (e.g. ABCD) 28 (e.g. an alternating pattern of magnetic transitions) that the servo control system samples to align the moveable transducer head with, and relative to, a particular track. Typically, the servo controller 98 moves the transducer head 64 toward a desired track during a "seek" mode using the TKID field 24 as a control input.

However, in processing information, it is necessary to ensure consistency in the detection of bits composing a block of bits. In order to ensure such consistency, the phase lock loop (PLL) field 20 is generally first read in order to facilitate bit synchronization. Next, the servo synch mark 22 may be read to facilitate block synchronization. The SSM 22 facilitates block synchronization by acting as a special marker that is detected to "frame" data, i.e., to identify a boundary of a block. A valid servo synchronization signal results in the read/write channel 68 of the disk drive 30 establishing a precise timing reference point for the reading of servo data and for read/write operations. It is well known to provide framing of servo data via a SSM 22. The wedge ID 26 is a binary encoded wedge ID number to identify the wedge.

Further, once head 64 is generally over a desired track 12, servo controller 98 uses the servo bursts (e.g. ABCD) 28 to keep head 64 over the track in a "track follow" mode. During track following mode, head 64 repeatedly reads the wedge ID 26 of each successive servo wedge to obtain the binary encoded wedge ID number that identifies each wedge of the track. Servo bursts 28 may also comprise null phase servo bursts.

Based on the TKID and wedge ID, servo controller 98 continuously knows where head 64 is relative to disk 46 and communicates this to microprocessor 84. In this way, the microprocessor 84 continuously knows where the head 64 is relative to the disk and can command the movement of the head 64, via the servo control system, to implement disk drive operations, suck as seeking, tracking, read/write operations, etc.

In one embodiment, servo controller 98 may operate under the control of a program or routine, such as a servo wedge misalignment calibration program 99 to execute methods or processes in accordance with embodiments of the invention related to characterizing servo wedges that are misaligned with respect to the rotating center of disk 46 due to disk slip or other mechanical factors and to compensate for this misalignment. As previously described, servo controller 98 is generally responsible for commanding seeking and track following operations via actuator assembly 40 and moveable head 64.

In one embodiment, disk drive 30 may characterize servo wedges 14 that are misaligned relative to the rotating center of disk 46 by servo controller 98 implementing a misalignment characterization program 99 that implements operations that include: commanding head 64 to track follow on a track 12 and measuring wedge-to-wedge time (WTWT) values corresponding to time intervals between identified servo wedges 14. Further, servo controller 98 calculates WTWT variations for the measured WTWT values and characterizes the calculated WTWT variations by utilizing a WTWT variation modeling function to model the WTWT variations.

Is should be appreciated that embodiments of the invention may be implemented with servo controller 98 and/or other circuitry, including microprocessor 84. Particularly, circuitry of the disk drive, including but not limited to servo controller 98 and/or microprocessor 84, may operate under the control of a program or routine to execute methods or processes in accordance with embodiments of the invention related to characterizing servo wedges that are misaligned with respect to the rotating center of disk 46 due disk slip or other mechanical factors and to compensate for this misalignment. For example, such a program may be implemented in firmware or software (e.g. stored in non-volatile memory 106 or other locations) and may be implemented by processors such as: servo controller 98, microprocessor 84, and/or other circuitry.

Components of the various embodiments of the invention may be implemented as hardware, software, firmware, microcode, or any combination thereof. When implemented in software, firmware, or microcode, the elements of the embodiment of the present invention are the program code or code segments that include instructions to perform the necessary tasks. A code segment may represent a procedure, a function, a subprogram, a program, a routine, a subroutine, a module, a software package, a class, or any combination of instructions, data structures, or program statements. The program or code segments may be stored in a processor readable medium or transmitted by a data signal embodied in a carrier wave, or a signal modulated by a carrier, over a transmission medium. The "processor readable or accessible medium" may include any medium that can store, transmit, or transfer information. Examples of accessible media include an electronic circuit, a semiconductor memory device, a read only memory (ROM), a flash memory, an erasable ROM (EROM), a floppy diskette, a compact disk (CD-ROM), an optical disk, a hard disk, a fiber optic medium, a radio frequency (RF) link, etc. The code segments may be downloaded via computer networks such as the Internet, Intranet, etc. The processor readable or accessible medium may include data that, when accessed by a processor or circuitry, cause the processor or circuitry to perform the operations described herein. The term "data" herein refers to any type of information that is encoded for machine-readable purposes. Therefore, it may include programs, code, data, files, etc.

Figure 3B:
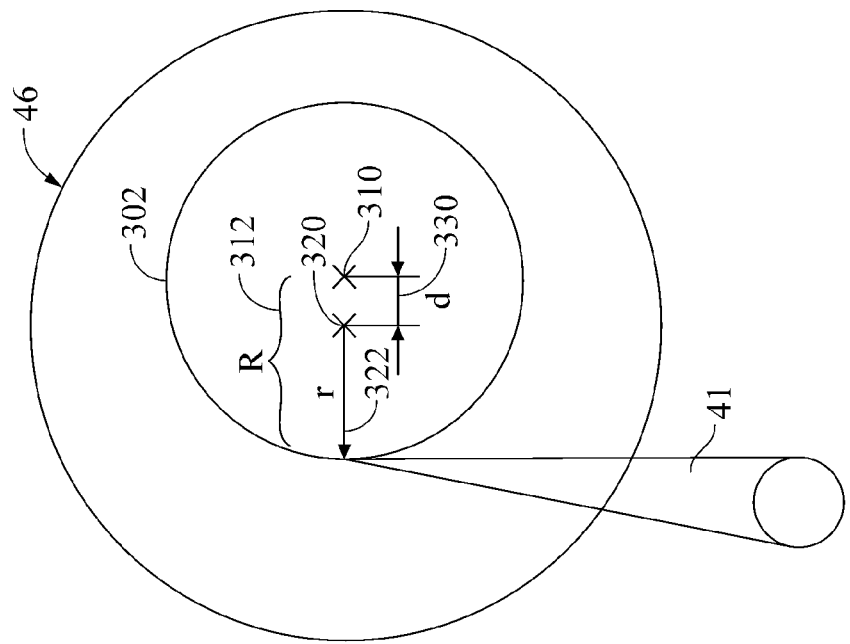
FIGS. 3A and 3B are diagrams illustrating a disk having a track with misaligned servo wedges relative to the rotating center of the disk.
Figure 3A:
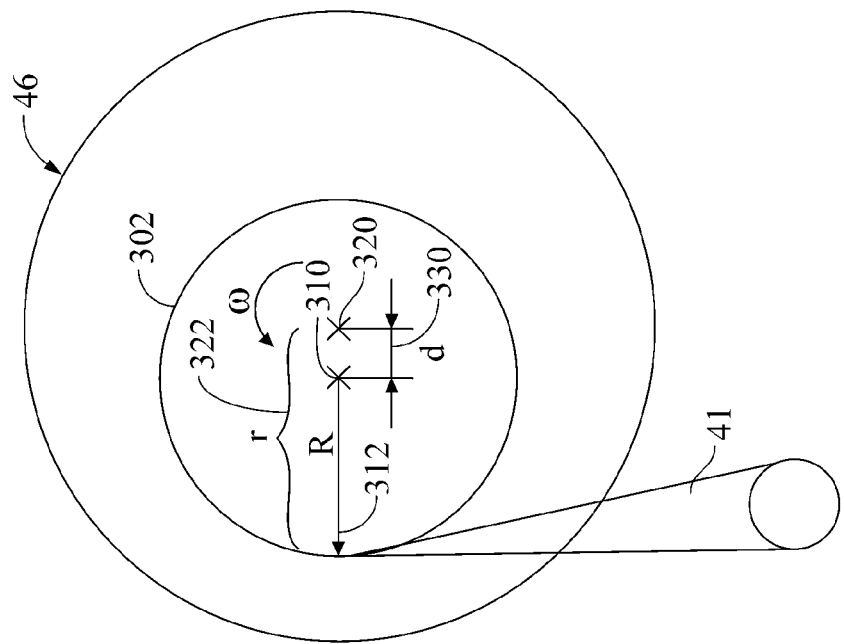

FIGS. 3A and 3B are diagrams illustrating a disk 46 having a track 302 that includes servo wedges that are misaligned relative to the rotating center 310 of the disk. As can be seen in FIG. 3A, track 302 rotates about rotating center 310 having radius R 312 as opposed to true disk center 320 having radius r 322. The eccentricity distance is noted as d 330. In FIG. 3A, the distance from rotating center, R 312, is equal to r−d. In FIG. 3A, the WTWT variation caused by disk slip is at its greatest because the radius r is at its greatest value. Also, actuator arm 41 is shown relative to disk 46.

Conversely, with respect to FIG. 3B, the WTWT variation is at a minimum value because the radius r is at a minimum value. In FIG. 3B, the distance from rotating center, R 312, is equal to r+d.

The description of the geometric modeling of WTWT time variation caused by disk slip and/or other factors will now be described. By utilizing a disk drive WTWT calculation function, WTWT intervals and variations may be measured and calculated. For example, the read/write channel may include a timer that may be utilized to calculate the time intervals for WTWT intervals and may form the basis for determining the variations thereof.

In particular, the WTWT calculation function may be used to learn timing errors between servo wedges (e.g., SSM to SSM) and position error signals (PESs), utilizing the timer of the read/write channel as a reference. Based upon these learned timing errors, the servo controller may adapt the timing of servo control signals (e.g. via frequency control) for use in the opening and closing of timing windows for the read/write channel of the disk drive for use in disk drive operation. In particular, the WTWT calculation function may be employed in the reading of servo data and in the reading and writing of user data. The WTWT calculation function may be employed by the servo controller to follow speed variations of read servo wedges in order to measure WTWT values corresponding to time intervals between identified servo wedges. In particular, servo-gate timing windows may be modified in order to accurately lock-on to servo wedges during characterizing servo wedge misalignment.

In essence, the SSM found signal is stamped onto the timer of the read/write channel which operates at a fixed frequency. The difference between the current time stamp and the preceding time stamp can be used to estimate the WTWT variation between consecutive read servo wedges. Thus, the servo controller in conjunction with the timer may measure WTWT values corresponding to time intervals between identified servo wedges and may calculate WTWT variations for the measured WTWT values based upon these measured WTWT values.

In particular, because each servo wedge includes a SSM field, the servo controller utilizing the timer may calculate WTWT time values between servo wedges based upon the time differences of the servo controller's recognition of the SSMs of the servo wedges. The servo controller may calculate variations between the time differences of the recognized SSMs of the servo wedges to calculate WTWT variations between the measured WTWT values.

Utilizing the above-described geometry of FIGS. 3A and 3B, it can be seen that due to the disk eccentricity (d 330), that WTWT variations are not constant even with constant spindle speed ($\omega$), as seen by the below equation:

$$WTWT(t) = \frac{2 \cdot \pi \cdot r}{N \cdot \omega \cdot R(t)}$$

This equation is based on the geometry discussed with reference to FIGS. 3A and 3B wherein r is the distance from the head to the disk center (radius of the track), R(t) is the instantaneous distance from the head to the rotating center, $\omega$ is the spindle angle velocity, N is the number of servo wedges on one track, and the eccentricity is denoted as d.

Assuming that the spindle speed $\omega$ is constant and servo wedges are evenly distributed on each track, when d=0, then R(t) is equal to r, and the WTWT variations are constant. However, when d does not equal 0, WTWT variations have a minimum when R=r+d, as shown in FIG. 3B, and are at a maximum when R=r−d, as shown in FIG. 3A.

It should be noted that the WTWT variation is in-phase with the displacement of the read servo wedges. This will be described in more detail later. Therefore, because WTWT variations are in-phase with the radial displacement of the head, the WTWT variations may be characterized by a WTWT variation modeling function that models the WTWT variations based upon the in-phase sinusoidal correspondence.

Figure 4:
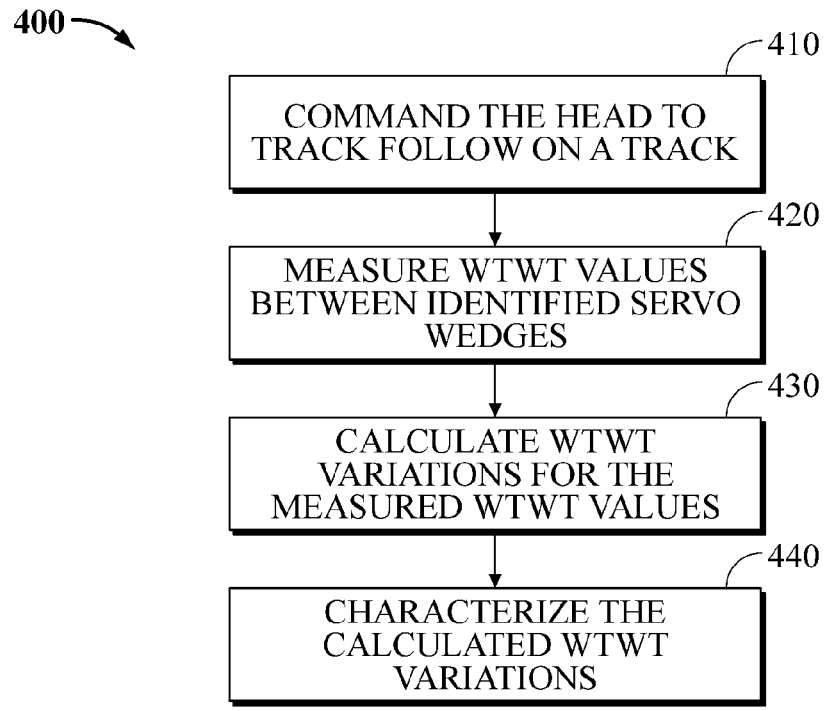
FIG. 4 is a flow diagram illustrating a process that may be utilized to calculate WTWT variations, according to one embodiment of the invention.

FIG. 4 is a flow diagram illustrating a process 400 that may be utilized to calculate WTWT variations. At block 410, the head is commanded to track follow on a track by the servo controller. WTWT values are measured between identified servo wedges by the servo controller in conjunction with the WTWT calculation function, as previously described (block 420). Then, at block 430, WTWT variations are calculated by the servo controller for the measured WTWT values. The calculated WTWT variations may then be characterized by the servo controller (block 440).

In particular, the calculated WTWT variations may be characterized by a WTWT variation modeling function that models the WTWT variations. For example, modeling coefficients may be determined for use in a sinusoidal-based function for modeling the WTWT variations for a track. In particular, modeling coefficients may be selected for use in a sinusoidal function of the form a*cos($\theta$)+b*sin($\theta$). Because the calculated WTWT variations are sinusoidal in nature, a sinusoidal WTWT variation modeling function having determined coefficients (e.g. a, b) may be utilized to model them. However, it should be appreciated that other sorts of modeling functions having modeling coefficients such as Fourier transform functions and other types of modeling functions may be used with equal advantage.

Figure 5:
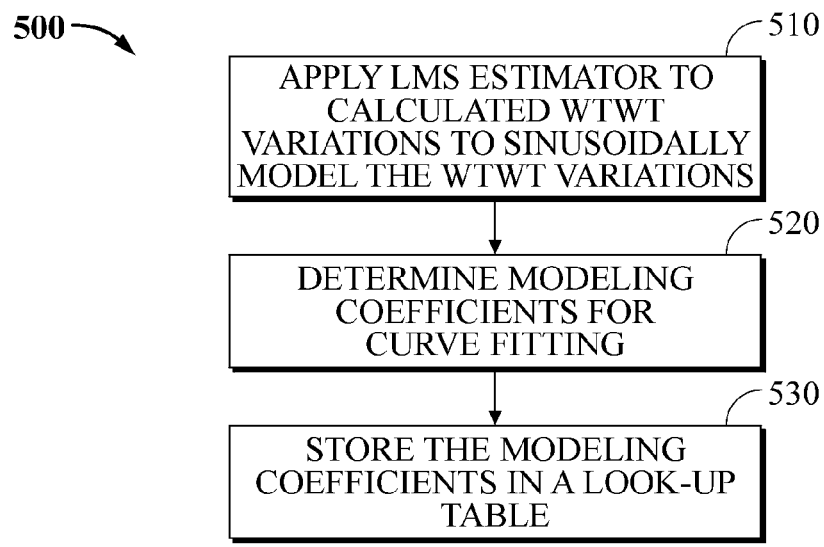
FIG. 5 is a flow diagram illustrating a process that utilizes a least means square (LMS) estimator to sinusoidally model WTWT variations, according to one embodiment of the invention.

FIG. 5 is a flow diagram illustrating a process 500 that utilizes a least means square (LMS) estimator to sinusoidally model WTWT variations. In one embodiment, the LMS estimator may be applied to the calculated WTWT variations to sinusoidally model the WTWT variations (block 510). At block 520, modeling coefficients (e.g. a, b) may be determined for curve fitting in a sinusoidal function of the form: a*cos($\theta$)+b*sin($\theta$).

As will be described, these modeling coefficients (e.g. a, b) may be stored in a look-up table for use in track following to compensate for servo wedge misalignment.

The LMS estimator filters out noise associated with the WTWT value measurement, as follows. Assume that WTWT equals a*cos(2*pi*k/N)+b*sin(2*pi*k/N)=$\theta^T$*$\omega$ where $\theta$=[a,b]$^T$,$\omega$=[cos(2*pi*k/N),sin(2*pi*k/N]$^T$. Estimated WTWT equals $$\hat{a} * \cos(2*pi*k/N) + \hat{b} * \sin(2*pi*k/N) = \hat{\theta}^T \omega \text{ where } \hat{\theta} = [\hat{a}, \hat{b}]$$

is the estimator of $\theta$. Therefore, the estimation error can be written as:

$$e = (\hat{\theta} - \theta)^T \omega.$$

This adaptation algorithm guarantees that the estimation error becomes zero, i.e., $$\lim_{k \to \infty} e(k)0,$$

which is given by $$\hat{\theta}(k+1) = \hat{\theta}(k) - g*e(k)*\omega(k).$$

These values may be re-written separately as:

$$\hat{a}(k+1) = \hat{a}(k) - g*e(k)*\cos(2*pi*k/N);$$

$$\hat{b}(k+1) = \hat{b}(k) - g*e(k)*\sin(2*pi*k/N),$$

where $0 < g \leq 2$.

As above, it can be seen that by using an LMS estimator, that the estimation error becomes zero such that correctly determined modeling coefficients for use in a sinusoidal modeling function provide an effective curve fit for WTWT variations.

Figure 6:
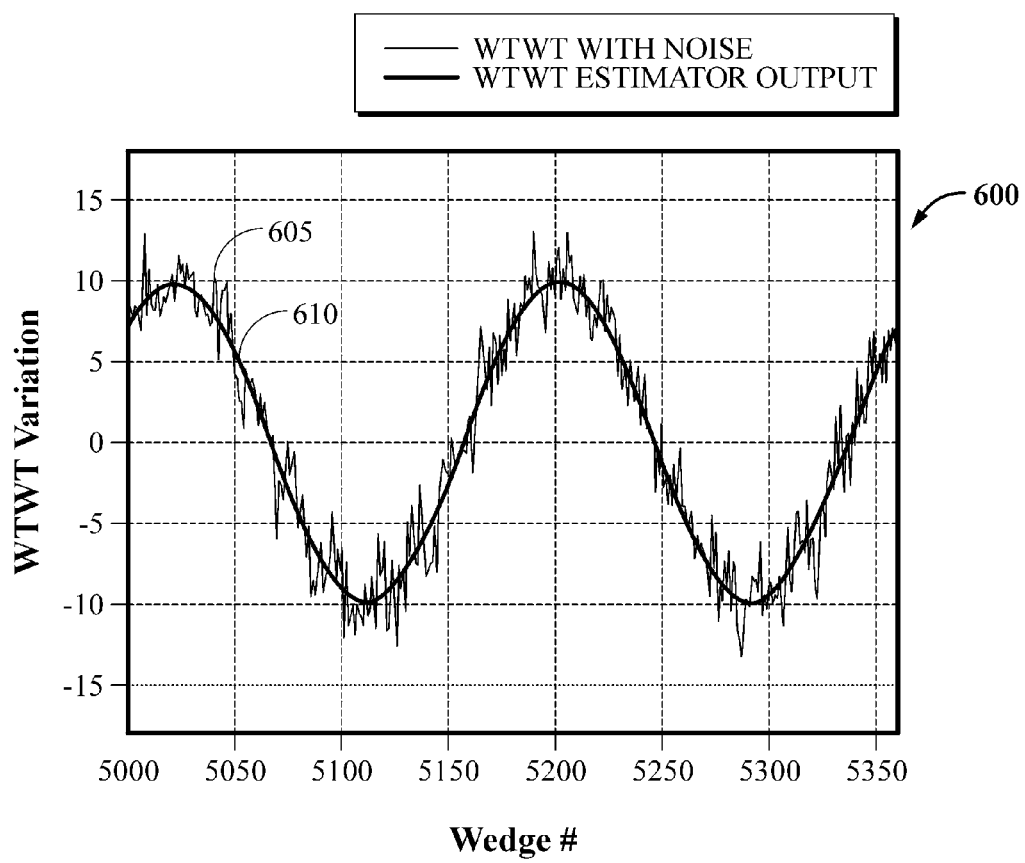
FIG. 6 is a graph that illustrates an exemplary WTWT estimation utilizing the LMS process for curve fitting, according to one embodiment of the invention.

FIG. 6 is a graph that illustrates an exemplary WTWT estimation utilizing the LMS process for curve fitting. As can be seen in graph 600, the y-axis denotes normalized WTWT variations and the x-axis is a section of wedge numbers for a track. In particular, line 605 illustrates exemplary measured WTWT variations directly measured utilizing the WTWT(t) equation previously described and illustrates that the WTWT variations are sinusoidal in nature but are noisy. Applying the previously-described LMS estimator results in a curve-fitted sinusoidal function 610 that provides a smooth curve-fitted sinusoidal function for the exemplary WTWT variation.

Accordingly, this previously-described functionality for determining and characterizing WTWT variations is based on the geometry of the disk and may avoid internal disk drive variations related to gain and phase.

In fact, the wedge-to-wedge time (WTWT) variations calculated as above may be directly in-phase with actual servo wedge displacement and may be scalable to the actual servo wedge displacement. Therefore, the WTWT variation modeling function can simply be scaled to replicate the actual displacement. Typically, the WTWT variation modeling function may be scaled to account for the head geometry which is used as a scaling factor.

Figure 7:
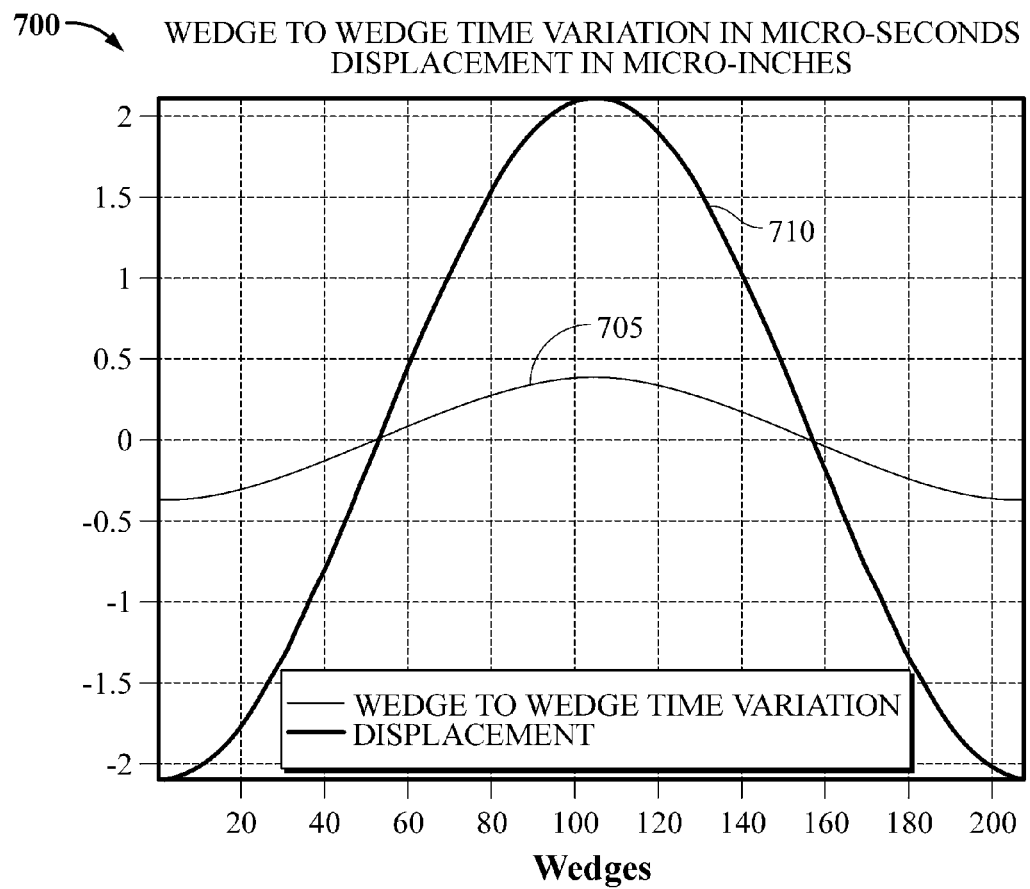
FIG. 7 is a graph that illustrates an exemplary WTWT variation modeled by a WTWT variation modeling function versus the actual servo wedge displacement, according to one embodiment of the invention.

FIG. 7 is a graph that illustrates an exemplary wedge-to-wedge time (WTWT) variation modeled by a sinusoidal WTWT variation modeling function versus the actual servo wedge displacement. As can be seen in FIG. 7, line 705 is a measure of an exemplary servo wedge displacement in micro-inches and curve 710 is a curve illustrating the exemplary WTWT variation in micro-seconds. The y-axis is a normalized scaling factor and the x-axis shows approximately 200 servo wedges which may, in some embodiments, be equivalent to one revolution of a disk. As can be seen, curve 705 and curve 710 are in phase and are scalable to one another such that the WTWT variation and the actual servo wedge displacement are in phase and scalable to one another.

Figure 8:
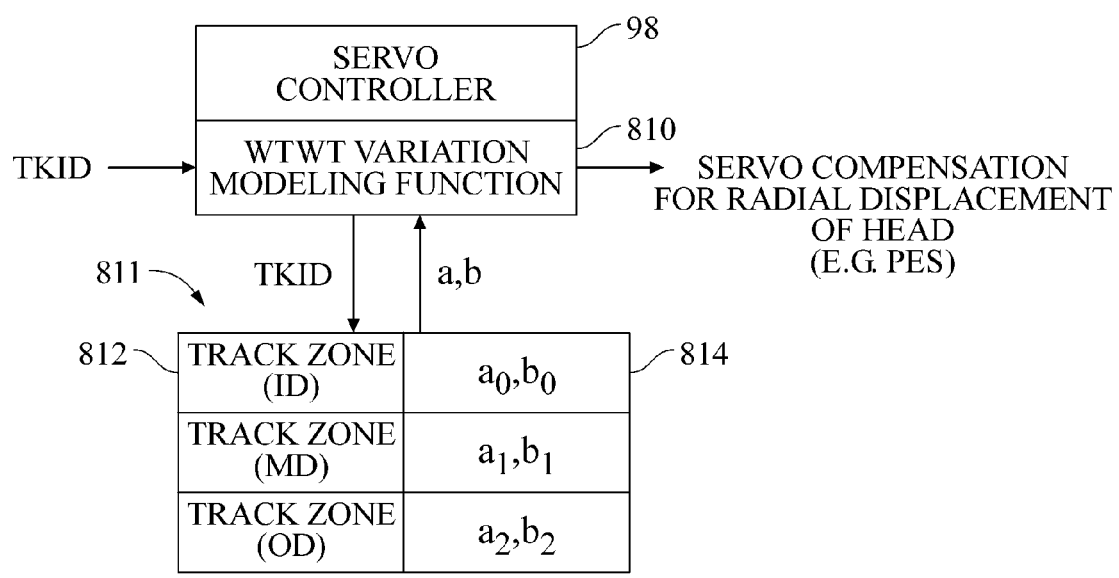
FIG. 8 is a block diagram of servo controller implementing a WTWT variation modeling function in conjunction with a look-up table, according to one embodiment of the invention.

FIG. 8 is a block diagram of servo controller 98 that may implement a WTWT variation modeling function 810 in conjunction with a look-up table 811. In particular, WTWT variation modeling function 810 may be utilized to characterize WTWT variation functions for one or more zones of the disk, such as: inner diameter (ID) track zones, middle diameter (MD) track zones, and outer diameter (OD) track zones. Based upon the previously described WTWT variation modeling function, modeling coefficients (e.g. a, b) may be respectively determined as previously described, and stored in the lookup table 811.

In this example, look-up table 811 may include representative track zones 812 for the: ID, MD, and OD and respectively store modeling coefficients (e.g. $a_0$, $b_0$, $a_1$, $b_1$, $a_2$, $b_2$) 814 for each of these respective idealized track zones.

During track-following on a track the servo controller 98 based upon a TKID input and implementing WTWT variation modeling function 810 determines and compensates for radial displacement errors of the head by selecting modeling coefficients 814 stored in the lookup table 811 for the track zone determined from the TKID input for use in the WTWT variation modeling function 810. As previously described, these radial displacement errors of the head are in phase and scalable to the WTWT variation modeling function.

It should be appreciated that look-up table 811 having only three track zones 812 (ID, MD, and OD) is only exemplary and that any number of track zones at different locations on the disk may be utilized. Further, it should be appreciated that interpolation functions may be utilized between the three track zones of look-up table 811 to obtain finer granularity and more precise results between track zones.

Thus, based upon an input TKID, the WTWT variation modeling function 810 may be supplied with modeling coefficients 814 depending on the location of the head with respect to the disk and the WTWT variation modeling function may calculate a servo compensation value for the radial displacement of the head, such as a PES value, and this PES value may be added to servo controller calculations to accurately compensate for the servo wedge misalignment during track-following caused by such mechanical characteristics as disk slip. In this way, the disk drive can accurately track-follow and perform read/write operations even in the presence of large disk slip. Moreover, this value may be directly added to the micro-jogging error (of the separate read and write elements) to compensate for disk slip or other mechanical factors.

Thus, with the previously-determined modeling coefficients a,b stored in look-up table 811 in conjunction with the use of the sinusoidal WTWT variation modeling function 810, a servo compensation value for the radial displacement of the head (such as a PES value) may be utilized in the servo control loop to compensate for servo wedge misalignment due to disk slip. This compensation value may be added into servo gate timing control, during each servo gate interrupt, during track-following operations, to improve track-following and read/write operations.

It should be appreciated that the WTWT variation modeling and characterization may be performed during initial disk drive testing, during power-up, and during pre-determined intervals during disk drive operation to continually optimize servo compensation for radial displacement of the head due to servo wedge misalignment due to disk slip, shock applied to the disk drive, and other mechanical factors. In this way, the disk drive may be continually updated due to changing mechanical characteristics to compensate for radial displacement errors of the head due to servo wedge misalignment. Further, these compensation values can be used to improve Adaptive Feed-Forward Cancellation (AFC) learning by properly setting initial conditions based upon the compensation values.

The methods and processes previously described can be employed for disk drives with embedded servo systems. However, numerous alternatives for disk drives with similar or other media format characteristics can be employed by those skilled in the art to use the invention with equal advantage to implement these techniques. Further, although embodiments have been described in the context of a disk drive with embedded servo sectors, the invention can be employed in many different types of disk drives having a head actuator that scans the media.

What is claimed is:

1. A disk drive to characterize servo wedges that are misaligned, the disk drive comprising:
    a head connected to a distal end of an actuator arm, the actuator arm rotatable about a pivot to move the head radially over the disk;
    a disk having a plurality of tracks, a substantial majority of the tracks including a plurality of servo wedges spaced sequentially around a circumference of the track for use in track following; and
    a servo controller to characterize misaligned servo wedges by implementing operations including:
        commanding the head to track follow on a track;
        measuring wedge to wedge time (WTWT) values corresponding to time intervals between identified servo wedges;
        calculating wedge to wedge time (WTWT) variations for the measured WTWT values; and
        characterizing the calculated WTWT variations, wherein characterizing the calculated WTWT variations for the track includes utilizing a WTWT variation modeling function to model the WTWT variations.

2. The disk drive of claim 1, wherein each servo wedge includes a servo synch mark (SSM) and WTWT time values between servo wedges are measured based upon the time difference of the servo controller recognition of the SSMs of the servo wedges.

3. The disk drive of claim 1, wherein characterizing the calculated WTWT variations for the track includes determining modeling coefficients for use in the WTWT variation modeling function to model the WTWT variations.

4. The disk drive of claim 3, wherein characterizing the calculated WTWT variations for the track includes applying a least means square estimator to the calculated WTWT variations to sinusoidally model the WTWT variations.

5. The disk drive of claim 4, wherein sinusoidally modeling the WTWT variations includes determining modeling coefficients for curve fitting.

6. The disk drive of claim 3, wherein the modeling coefficients are stored in a look-up table.

7. The disk drive of claim 6, wherein WTWT variations are characterized with the WTWT variation modeling function for one or more track zones of the disk and modeling coefficients for each of the one or more track zones are respectively determined and stored in the look-up table.

8. The disk drive of claim 7, wherein, during track-following on a track, the servo controller determines and compensates for radial displacement errors of the head by selecting the modeling coefficients stored in the look-up table for the track zone for use in the WTWT variation modeling function, the radial displacement errors being in-phase and scalable to the WTWT variation modeling function.

9. The disk drive of claim 8, wherein the WTWT variation modeling function is scaled to account for head geometry.

10. In a disk drive including an actuator arm and a head connected to a distal end of the actuator arm, the actuator arm being rotatable about a pivot to move the head radially over a disk, the disk having a plurality of tracks in which a substantial majority of the tracks include a plurality of servo wedges spaced sequentially around a circumference of the track for use in track following, a method to characterize misaligned servo wedges comprising:
    commanding the head to track follow on a track;
    measuring wedge to wedge time (WTWT) values corresponding to time intervals between identified servo wedges;
    calculating wedge to wedge time (WTWT) variations for the measured WTWT values; and
    characterizing the calculated WTWT variations, wherein characterizing the calculated WTWT variations for the track includes utilizing a WTWT variation modeling function to model the WTWT variations.

11. The method of claim 10, wherein characterizing the calculated WTWT variations for the track further comprises determining modeling coefficients for use in the WTWT variation modeling function to model the WTWT variations.

12. The method of claim 11, wherein characterizing the calculated WTWT variations for the track further comprises applying a least means square estimator to the calculated WTWT variations to sinusoidally model the WTWT variations.

13. The method of claim 12, wherein sinusoidally modeling the WTWT variations further comprises determining modeling coefficients for curve fitting.

14. The method of claim 11, further comprising storing the modeling coefficients in a look-up table.

15. The method of claim 14, wherein WTWT variations are characterized with the WTWT variation modeling function for one or more track zones of the disk and modeling coefficients for each of the one or more track zones are respectively determined and stored in the look-up table.

16. The method of claim 15, wherein, during track-following on a track, further comprising determining and compensating for radial displacement errors of the head by selecting the modeling coefficients stored in the look-up table for the track zone for use in the WTWT variation modeling function, the radial displacement errors being in-phase and scalable to the WTWT variation modeling function.

17. The method of claim 16, further comprising scaling the WTWT variation modeling function to account for head geometry.

18. A disk drive to characterize misaligned servo wedges comprising:
    means for moving a head radially over a disk having a plurality of tracks, a substantial majority of the tracks including a plurality of servo wedges spaced sequentially around a circumference of the track for use in track following;
    means for commanding the head to track follow on a track;
    means for measuring wedge to wedge time (WTWT) values corresponding to time intervals between identified servo wedges;
    means for calculating wedge to wedge time (WTWT) variations for the measured WTWT values; and
    means for characterizing the calculated WTWT variations, wherein the means for characterizing the calculated WTWT variations for the track includes utilizing a WTWT variation modeling function to model the WTWT variations.

19. The disk drive of claim 18, wherein each servo wedge includes a servo synch mark (SSM) and WTWT time values between servo wedges are measured based upon the time difference of the servo controller recognition of the SSMs of the servo wedges.

20. The disk drive of claim 18, wherein the means for characterizing the calculated WTWT variations for the track includes means for determining modeling coefficients for use in the WTWT variation modeling function to model the WTWT variations.

21. The disk drive of claim 20, wherein the means for characterizing the calculated WTWT variations for the track includes means for applying a least means square estimator to the calculated WTWT variations to sinusoidally model the WTWT variations.

22. The disk drive of claim 21, wherein sinusoidally modeling the WTWT variations includes means for determining modeling coefficients for curve fitting.

23. The disk drive of claim 20, wherein the modeling coefficients are stored in a look-up table.

24. The disk drive of claim 23, wherein WTWT variations are characterized with the WTWT variation modeling function for one or more track zones of the disk and modeling coefficients for each of the one or more track zones are respectively determined and stored in the look-up table.

25. The disk drive of claim 24, wherein, during track-following on a track, further comprising means for determining and compensating for radial displacement errors of the head by selecting the modeling coefficients stored in the look-up table for the track zone for use in the WTWT variation modeling function, the radial displacement errors being in-phase and scalable to the WTWT variation modeling function.

26. The disk drive of claim 25, wherein the WTWT variation modeling function is scaled to account for head geometry.

* * * * *